March 8, 1932. J. C. BLAIR 1,848,153
PROCESS OF AND APPARATUS FOR PRODUCING SHEET GLASS
Filed June 22, 1928
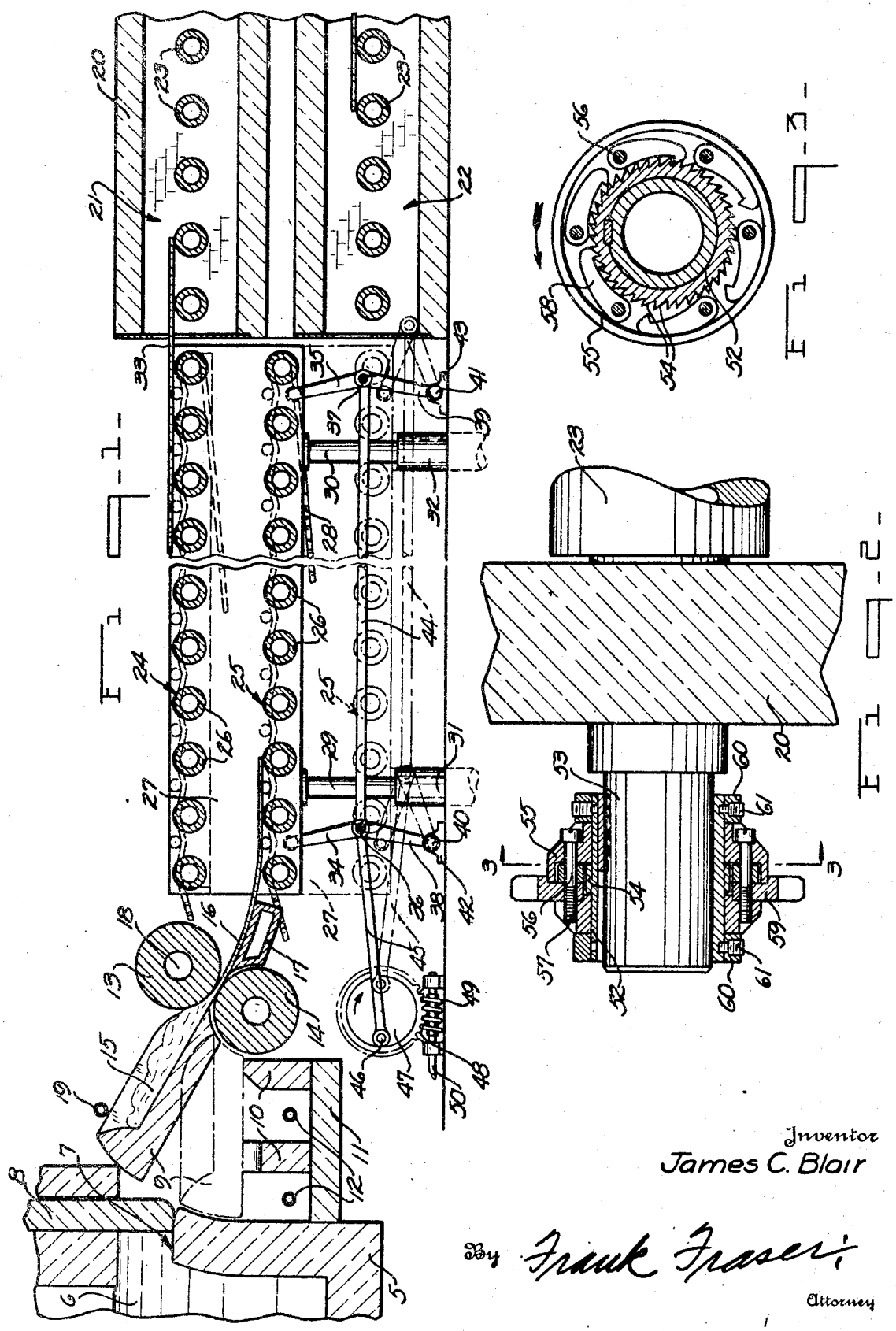
Inventor
James C. Blair
By Frank Fraser
Attorney Patented Mar. 8, 1932

1,848,153

UNITED STATES PATENT OFFICE

JAMES C. BLAIR, OF TOLEDO, OHIO, ASSIGNOR TO LIBBEY-OWENS-FORD GLASS COMPANY, OF TOLEDO, OHIO, A CORPORATION OF OHIO

PROCESS OF AND APPARATUS FOR PRODUCING SHEET GLASS

Application filed June 22, 1928. Serial No. 287,361.

The present invention relates to a process of and an apparatus for producing sheet glass, and more particularly to improvements therein tending to facilitate, expedite and improve generally the manufacture thereof. While this invention has been designed primarily for the production of plate glass blanks which are to be subsequently ground and polished, it can nevertheless be utilized to produce ordinary window glass if desired.

In its general aspect, the invention aims to provide an improved process and apparatus whereby molten glass may be reduced to sheet form at one speed, after which the sheets may be annealed while traveling at a different speed.

An important object of the invention is the provision of such an improved process and apparatus, wherein a glass sheet is formed from a mass of molten glass at a relatively high rate of speed and deposited, while traveling at such speed, on a conveying means, the sheet being subsequently removed from said means into an annealing leer and passed therethrough at a different and preferably slower rate of speed.

Another object of the invention is the utilization of sheet supporting and conveying means movable alternately to a sheet receiving position and a sheet delivering position, means being provided for forming a sheet of glass and depositing the same upon said supporting and conveying means when the same is in receiving position, and an annealing leer for receiving the glass sheet from the supporting and conveying means when the same is moved into delivering position.

Another object is to provide an annealing leer consisting of a plurality of annealing sections, and sheet glass forming means whereby molten glass may be reduced to sheet form and the sheet fed into the desired section of the annealing leer.

Still another object is the provision of a double-deck annealing leer, and sheet glass forming means whereby molten glass may be rolled to sheet form, means being provided for receiving the sheets from the forming means, said receiving means being adjustable in such a manner that the sheets will be alternately fed into the top and bottom of the double-deck leer.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section illustrating diagrammatically a portion of my improved construction.

Fig. 2 is a sectional detail view of a portion of the apparatus, and

Fig. 3 is a section taken substantially on line 3—3 of Fig. 2.

As above stated, the improved construction herein provided has been designed primarily for the production of plate glass blanks although it can also be used to produce ordinary window glass if desired. Briefly stated, this invention contemplates the reduction of molten glass to sheet form at a relatively high rate of speed so that the molten glass will contact with the sheet forming mechanism for only a relatively short time, the sheet being then transferred to an annealing leer which is so designed that the speed of travel of the sheet can be materially reduced and the same passed therethrough at such reduced speed, so that the length of the leer need not be unnecessarily long. The formation of the glass sheet at a relatively high rate of speed, is desirable for several reasons: In the first place, the glass will not be unduly chilled before it is reduced to sheet form. Secondly, the contact of the glass with the relatively cool forming mechanism will be relatively short and therefore the surfaces of the glass sheet will not be unduly marred and thirdly, by forming the glass sheet at a relatively rapid rate, production can be materially increased. The molten glass supplied to the sheet forming mechanism may be produced in individual pots or supplied thereto from a tank furnace as preferred.

Referring to Fig. 1 of the drawings, the numeral 5 designates the exit end of a suitable furnace of any desired type within which is adapted to be produced and suitably refined the mass or body of molten glass 6. The forward end wall of the furnace 5 is preferably provided with a discharge outlet 7 controlled by means of a vertically adjustable gate or shear cake 8. Arranged in advance of the furnace 5 and beneath the level of the discharge outlet 7 is a tiltable pot or slab 9 normally disposed in a substantially horizontal position as indicated by the broken lines, the slab being supported when in such position upon a plurality of stools 10 arranged within a compartment 11 heated by means of burners or the like 12.

Arranged in advance of the slab 9 are the sheet forming rolls 13 and 14 spaced from one another a sufficient distance to create a sheet forming pass therebetween. The slab 9 is, as above stated, normally maintained in a substantially horizontal position and when in such position is adapted to intermittently receive a charge or mass of molten glass 15 from the furnace 5, the said glass flowing through the discharge outlet 7 upon raising of the adjustable gate 8. The slab 9 is then adapted to be tilted upwardly to the inclined position indicated by the full lines so that the charge of glass 15 will pass downwardly to and between the forming rolls 13 and 14 and rolled thereby to a sheet of substantially predetermined thickness as indicated at 16, the sheet being received as it leaves the forming rolls upon a table or slab 17. Each of the forming rolls 13 and 14 is preferably provided with a central bore 18 through which is adapted to be circulated a suitable temperature control medium. The distance between the forming rolls 13 and 14 is also preferably variable in order that different thicknesses of sheet may be produced. The rolls are preferably yieldably urged toward one another so as to allow for a separation of the rolls should foreign matter or exceptionally thick, cold pieces of glass enter the sheet forming pass, whereby injury to the rolls from such source may be prevented. A burner or the like 19 may be provided for heating the glass 15 upon the slab 9 to maintain it at the desired temperature.

As shown in Fig. 1, the annealing leer herein provided is designated 20 and includes a plurality of annealing sections or decks 21 and 22, each section or deck of the leer having arranged therein a plurality of sheet supporting and conveying rolls 23. Mounted between the sheet forming rolls 13 and 14 and the leer 20 is a pair of superimposed sheet receiving and delivering tables designated in their entirety 24 and 25 respectively and each consisting of a plurality of horizontally arranged rolls 26 journaled at their opposite ends in the opposite side walls of the housing 27. The rolls 26 are adapted to be positively driven by means of chains or the like 28 trained about suitable gears carried on the roll shafts. The housing 27 is supported at either side thereof, adjacent its front and rear ends, upon plungers 29 and 30 operable in cylinders 31 and 32 respectively whereby the said housing 27 together with the conveying tables 24 and 25 may be raised and lowered as a unit, the said housing and tables being adapted to assume a raised position as indicated by the full lines in Fig. 1 and a lowered position as indicated by the dotted lines.

When the housing is in its raised position, the upper conveying table 24 is in delivering position or, otherwise stated, the rolls 26 thereof are in horizontal alignment with the rolls 23 of the upper section or deck 21 of annealing leer 20 so that the sheet 33 may be delivered from the table 24 into the leer section 21, through which it is adapted to pass to be properly annealed. When the upper table 24 is in sheet delivering position, the lower table 25 is in receiving position or, in other words, in cooperative relation with respect to the slab 17 and forming rolls so that the sheet 16 being formed will be received thereon. When the housing 27 is lowered the upper table 24 will be brought into receiving position and the lower table 25 into delivering position. That is, the rolls 26 of the lower table 25 will be in horizontal alignment with the rolls 23 of the lower leer section 22 so that the sheet may be passed from the former onto the latter.

In the operation of the apparatus herein provided, the conveying tables 24 and 25 are first placed either in raised position or in lowered position, they being shown in the drawings for the purposes of illustration in raised position so that the upper table 24 is in delivering position opposite the upper leer section 21 and the lower table 25 in receiving or cooperative position with respect to the sheet forming mechanism. A mass or charge of molten glass 15 is then adapted to be flowed from the furnace 5 upon the slab 9 while said slab is in its horizontal position although, if desired, the molten glass may be deposited upon the slab from a suitable pot within which it has been previously melted and refined. The slab 9 is then adapted to be tilted upwardly as shown and since the slab is in an inclined position, the glass will tend to flow downwardly to the sheet forming pass and upon rotation of the forming rolls, the glass will be fed therebetween and reduced to a sheet 16 of substantially predetermined thickness, this sheet then passing over the slab 17 onto the rolls 26 constituting the lower conveying table 25. It is preferred that the peripheral speed of the sheet forming rolls be relatively fast so that the mass of molten glass 15 will be quickly reduced to sheet form, some of the advantages of such an arrangement being set forth hereinabove. The peripheral speed of the rolls constituting the conveying tables 24 and 25 is substantially identical with the peripheral speed of the sheet forming rolls so that the sheet will be carried ahead upon the tables as rapidly as it is formed, whereby to prevent buckling of the sheet.

After the sheet 16 has been run onto the table 25, the housing 27 and tables 24 and 25 are adapted to be lowered so that the upper table 24 will be brought into receiving or cooperative position relative to the forming mechanism and the lower table 25 into delivering position opposite the lower leer section 22 in order that the sheet upon said table may be delivered therefrom into said leer section. Of course, it will be evident that the rotation of the rolls 26 constituting the conveying tables 24 and 25 is momentarily stopped during the movement of said tables from sheet receiving to sheet delivering position. One charge or mass of molten glass 15 is adapted to be rolled out during each forming operation and during the changing of the relative positions of the tables 24 and 25, the slab 9 may be lowered and another charge or mass of molten glass 16 flowed thereon. Upon the delivery of the sheet from the table 25 into the lower leer section 22, a second sheet is adapted to be rolled upon the table 24 after which the tables can be raised so that the sheet now on table 24 can be delivered into the upper section of the leer and another sheet formed and deposited upon the now emptied table 25. Thus, the sheets formed will be fed alternately into the upper and lower sections or decks of the leer. If but a single leer were to be used and the sheets were rolled one after the other, it will be readily apparent that the sheets would soon pile up on one another. To permit a constant rolling of molten glass into sheet form, the double-deck leer 20 is provided and by moving the conveying tables 24 and 25 alternately to a sheet receiving and sheet delivering position, a sheet can be fed first into the upper deck of the leer and then into the lower deck thereof.

While any desired means may be utilized for effecting the raising and lowering of the housing 27 and conveying tables 24 and 25, the means herein provided for accomplishing this purpose is as follows: Pivotally carried by the housing 27 at either side thereof adjacent its front and rear ends are the depending links 34 and 35 pivotally connected with the shafts 36 and 37 respectively. Also pivotally connected with the shafts 36 and 37 are the links 38 and 39 pivoted at their lower ends as at 40 and 41 respectively to the fixed supports 42 and 43. The shafts 36 and 37 extend transversely of the housing and have similar links associated therewith at the opposite end thereof. Connecting the shafts 36 and 37 is a connecting rod 44 and pivotally associated with the shaft 36 is a pitman 45 pivoted as at 46 to the eccentric 47, said eccentric carrying gear 48 meshing with a worm 49 driven from shaft 50. When the tables 24 and 25 are in raised position, the parts of the apparatus assume the position indicated by the full lines so that the links 34, 38 and 35, 39 are extended or in a substantially vertical position. When it is desired to lower the tables, the eccentric 47 is rotated substantially one-half a revolution in the direction indicated by the arrow so as to cause a folding or collapsing of the said links 34, 38 and 35, 39 as indicated by the broken lines. Thus, the links 34, 38 and 35, 39 together with their associated parts operate on the principle of a toggle-joint to effect the raising and lowering of the conveying tables 24 and 25.

As above stated, the peripheral speed of the rolls 26 constituting the tables 24 and 25 is substantially identical with the peripheral speed of the sheet forming rolls 13 and 14. When the sheet leaves the conveying table, it is desirable that it be substantially set and capable of sustaining its own weight. However, if the glass sheet is passed through an annealing leer at the same rapid speed at which it is formed, it will be apparent that the length of the annealing leer would have to be considerable in order that proper annealing of the sheet might be achieved. Therefore, the annealing leer herein provided is of such a character that the glass sheets can be formed rapidly and annealed slowly.

To allow for a change in the speed of travel of the sheet as it enters the leer, the first leer rolls at the intake end of said leer are provided with overrunning clutches as illustrated in Figs. 2 and 3. The overrunning clutch comprises a sleeve 52 keyed to the shaft 53 of the leer roll 23, the sleeve 52 being provided with ratchet teeth 54. Encircling the sleeve 52 is a ring 55 through which extend a plurality of pivot pins 56 screw threaded at one end as at 57 to prevent accidental displacement thereof. The pins 56 are adapted to carry pawls 58 and also a sprocket wheel 59. The ring members 60 and set screws 61 are designed to prevent accidental displacement of the ring 55 and associated parts. The sprocket wheel 59 has trained thereover a suitable sprocket chain, not shown, which drives the roll in the direction indicated by the arrow in Fig. 3. Normally, the pawls 58 engage the teeth 54 on sleeve 52 to positively drive the rolls 23. In the event, however, that the speed of the sheet exceeds the peripheral speed of the rolls, due to frictional contact between the sheet and roll, the sheet is allowed to drive the roll faster than it is positively driven. When this occurs, the pawls 58 simply ride freely over the teeth 54 on sleeve 52. By providing the intake end of the leer with rolls driven in this manner, the sheet will enter the leer at a relatively high speed and will gradually lose its speed until it is carried forward at the speed at which the leer rolls are positively driven.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the manufacture of sheet glass, a plurality of superimposed conveying tables movable vertically alternately to a sheet receiving position and a sheet delivering position, means for intermittently forming successive sheets of glass and in passing each sheet onto one of the tables when said table is in receiving position, and an annealing leer for receiving the sheet from the table when said table is in delivering position.

2. In apparatus for the manufacture of sheet glass, a plurality of superimposed conveying tables movable alternately to a sheet receiving position and a sheet delivering position, means for intermittently forming successive sheets of glass and passing each sheet onto one of the tables in receiving position, and an annealing leer for receiving the sheet from the table when in delivering position.

3. In apparatus for the manufacture of sheet glass, a plurality of superimposed conveying tables, one of said tables being maintained in a sheet delivering position while the other is maintained in a sheet receiving position, means for intermittently forming successive sheets of glass and passing each sheet onto one of the tables in receiving position, and an annealing leer for receiving the sheet from the table when in delivering position.

4. In apparatus for the manufacture of sheet glass, an annealing leer including a plurality of superimposed annealing sections, sheet forming means, a plurality of superimposed conveying tables positioned between said leer and forming means, and means for adjusting said conveying tables vertically as a unit to bring one of said tables into cooperative relation with the forming means and the other into delivering position opposite one of the leer sections.

5. In apparatus for the manufacture of sheet glass, an annealing leer including upper and lower annealing sections, sheet forming means, upper and lower conveying tables positioned between the leer and sheet forming means, and means for adjusting the conveying tables vertically so that each table will be brought first into cooperative relation with respect to the forming means and then opposite one of the leer sections.

6. In apparatus for the manufacture of sheet glass, an annealing leer including upper and lower annealing sections, sheet forming means, upper and lower conveying tables positioned between the leer and sheet forming means, and means for moving said tables vertically as a unit in such a manner that when the lower conveying table is in cooperative relation with the sheet forming means, the upper conveying table will be in delivering position opposite the upper leer section, and that when the upper table is in cooperative relation with the sheet forming means, the lower table will be in delivering position opposite the lower leer section.

7. In apparatus for the manufacture of sheet glass, an annealing leer including a plurality of superimposed annealing sections, a conveyor arranged in each of said sections, means for driving each of said conveyors at a relatively low rate of speed, sheet forming means, a plurality of superimposed conveying tables positioned between said leer and forming means, means for driving said sheet forming means at a relatively high rate of speed, means for driving said superimposed conveying tables at a relatively high rate of speed, and means for adjusting said conveying tables vertically as a unit to bring one of said tables into cooperative relation with the forming means and the other into delivering position opposite one of the leer sections.

8. In apparatus for the manufacture of sheet glass, an annealing leer including a plurality of superimposed annealing sections, a conveyor arranged in each of said sections, means for driving each of said conveyors at a relatively low rate of speed, sheet forming means, a plurality of superimposed conveying tables positioned between said leer and forming means, means for driving said sheet forming means at a relatively high rate of speed, means for driving said superimposed conveying tables at a relatively high rate of speed, and means for adjusting said conveying tables vertically as a unit to bring one of said tables into cooperative relation with the forming means and the other into delivering position opposite one of the leer sections, at least a portion of the conveyor means in the annealing leers being provided with clutch means which will permit the said conveyor means to be moved by the sheet at a rate of speed greater than the normal driven rate of speed thereof.

9. The process of producing sheet glass, consisting in reducing a mass of molten glass to a sheet of substantially predetermined thickness at a relatively high rate of speed, passing the sheet as it is formed upon one of a pair of supporting surfaces traveling at substantially the same speed, moving said supporting surface vertically from its sheet receiving to a sheet delivering position, passing the sheet from said surface into an annealing leer, simultaneously forming a second sheet and passing the same onto the second supporting surface, and in conveying the first mentioned sheet through said leer at a slower rate of speed than the speed at which it was formed.

Signed at Toledo, in the county of Lucas and State of Ohio, this 15th day of June, 1928.

JAMES C. BLAIR.